United States Patent [19]

Weatherspoon

[11] Patent Number: 4,726,406
[45] Date of Patent: Feb. 23, 1988

[54] WINDSHIELD COVER

[76] Inventor: William T. Weatherspoon, 16 E. 34th Ter., Kansas City, Mo. 64111

[21] Appl. No.: 867,969

[22] Filed: May 29, 1986

[51] Int. Cl.⁴ ............................. B60J 1/00; B60J 11/00
[52] U.S. Cl. ................................ 150/52 K; 150/52 R; 296/95 C; 296/136
[58] Field of Search .......................... 150/52 K, 52 R; 296/97 A, 95 C, 97 D, 136, 95 R, 100

[56] References Cited

U.S. PATENT DOCUMENTS

| | | | |
|---|---|---|---|
| 2,595,833 | 5/1952 | Flaherty | 150/52 K X |
| 2,599,066 | 6/1952 | Osborn | 296/95 C |
| 3,588,169 | 6/1971 | Lunt | 296/95 C |
| 4,025,103 | 5/1977 | Eichstaedt | 296/95 C |
| 4,049,036 | 9/1977 | Gebhardt | 150/52 K |
| 4,209,197 | 6/1980 | Fischer | 150/52 K X |
| 4,399,347 | 8/1983 | Schmitt | 296/95 C X |
| 4,560,245 | 12/1985 | Sarver | 296/97 D X |
| 4,597,608 | 7/1986 | Duffy | 296/95 C |

FOREIGN PATENT DOCUMENTS

| | | | |
|---|---|---|---|
| 611191 | 12/1960 | Canada | 296/95 C |
| 674216 | 11/1963 | Canada | 150/52 K |
| 2606166 | 8/1977 | Fed. Rep. of Germany | 296/95 C |
| 2755263 | 6/1979 | Fed. Rep. of Germany | 296/136 |
| 1463178 | 12/1966 | France | 296/95 C |
| 1580155 | 9/1969 | France | 296/95 C |
| 1102604 | 2/1968 | United Kingdom | 296/95 C |

*Primary Examiner*—William Price
*Assistant Examiner*—Sue A. Weaver
*Attorney, Agent, or Firm*—Kokjer, Kircher, Bradley, Wharton, Bowman & Johnson

[57] ABSTRACT

A protective cover for a vehicle window includes a vinyl sheet having a cloth backing for application to the window. The sheet is held in place by straps which are looped around stiffener bars on the side edges of the sheet. The straps extend into the interior of the vehicle where they are attached to mating fasteners in order to secure the sheet on the window. The attachment system permits detachment of the protective sheet only from the interior of the vehicle and thereby provides security against theft.

2 Claims, 3 Drawing Figures

WINDSHIELD COVER

BACKGROUND AND SUMMARY OF THE INVENTION

This invention relates to a cover which serves as weather protection for the window of a vehicle such as the windshield of an automobile, truck, boat, or airplane.

When automobiles and other vehicles are stored outside, the windshields and other windows of the vehicle are exposed and can be subjected to damage and other problems caused by the weather. For example, hail storms can break the windshield and other windows, as well as causing damage to the body of the vehicle. During the winter, ice and snow can build upon the windows, thus requiring considerable scraping before the vehicle can be driven. In the summer, the sun shining through the windows can make the interior of the vehicle so hot that it is uncomfortable at best. In addition, the sunlight can cause the vehicle interior to fade and become discolored.

The present invention is directed to a windshield cover which has, as its primary goal, the elimination of the foregoing problems. More specifically, it is an important object of the invention to provide a windshield cover that can be quickly and easily applied to and removed from a vehicle window.

Another important object of the invention is to provide a windshield cover which can be applied either to the front or back window of virtually any vehicle.

A further object of the invention is to provide a windshield cover that can be removed while a person remains inside the vehicle. Accordingly, in inclement weather, it is not necessary to stand outside of the vehicle in order to remove the windshield cover.

An additional object of the invention is to provide a windshield cover of the character described which is securely held in place on the windshield and which can only be removed from the inside of the vehicle, thereby preventing the cover from being blown away or stolen.

Still another object of the invention is to provide, in a windshield cover of the character described, a unique system for holding the cover in place on the windshield.

Yet another object of the invention is to provide a windshield cover in which none of the parts are subject to rust or other damage from the weather.

A still further object of the invention is to provide a windshield cover of the character described which is simple and economical to construct and which can be conveniently and compactly stored when not in use.

Other and further objects of the invention, together with the features of novelty appurtenant thereto, will appear in the course of the following description.

DETAILED DESCRIPTION OF THE INVENTION

In the accompanying drawing which form a part of the specification and is to be read in conjunction therewith and in which like reference numerals are used to indicate like parts in the various views.

Figure 1:
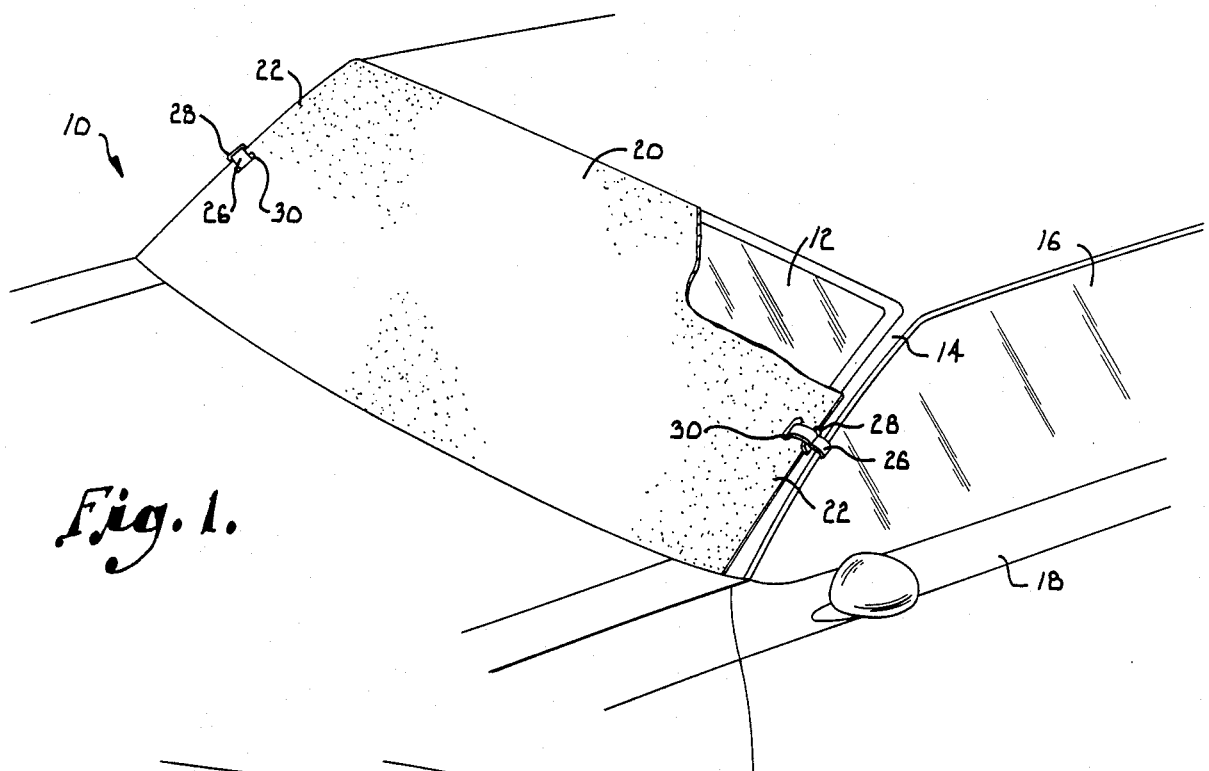
FIG. 1 is a perspective view showing a portion of an automobile having the windshield cover of the present invention applied to its windshield, with a portion of the cover broken away for purposes of illustration.
Figure 2:
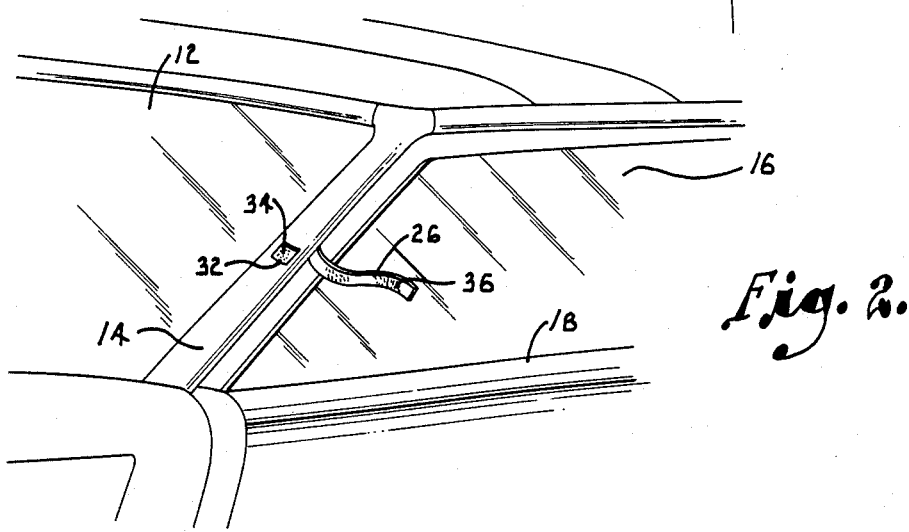
FIG. 2 is a fragmentary perspective view from the inside of the vehicle, and showing one of the straps of the cover released from its fastening patch.

Referring now to the drawing in more detail, numeral 10 generally designates an automobile having a conventional windshield 12 on the front of the passenger compartment. The frame of the windshield 12 includes posts 14 on opposite sides of the vehicle and in front of side windows 16 which form upper parts of the front doors 18 of the vehicle. It should be understood that the windshield cover of the present invention may be applied to the windows of vehicles other than automobiles, such as trucks, vans, boats and airplanes. It should also be understood that the windshield cover can be applied to the rear window of a vehicle as well as to the windshield 12.

The windshield cover of the present invention includes a flexible sheet 20 which is constructed of a water proof and weather proof vinyl material that is backed by a nylon treated cloth backing. The cloth backing is on the inside surface of the sheet when it is applied to the windshield 12. The cloth backing is soft enough to avoid scratching the glass. The vinyl is on the outside surface of the sheet and is resistant to the sun as well as to water and other adverse effects from the weather. Vinyl is also advantageous in that snow and ice do not readily adhere to it and can be easily shaken off of the vinyl if they should build up on it while the cover is in place on the window. Vinyl is also capable of taking heat up to 200° F. The vinyl is preferably black or another dark color.

Figure 3:
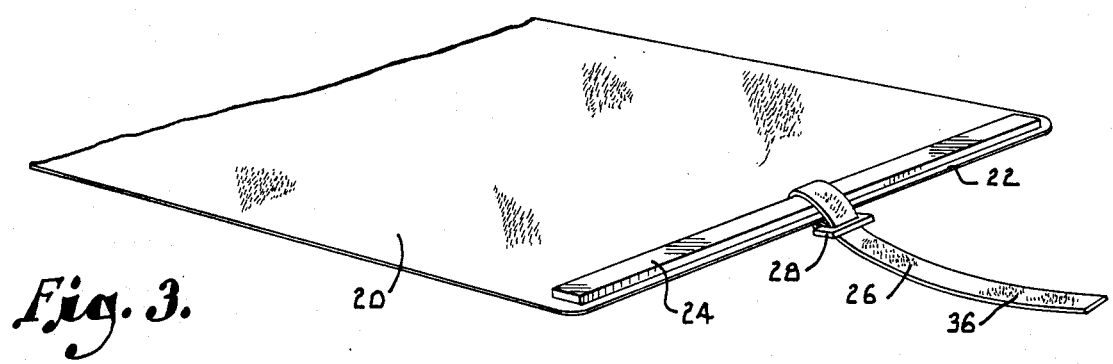
FIG. 3 is a fragmentary perspective view of the inside surface of the windshield cover.

The sheet 20 is large enough to completely cover the surface of the windshield 12 on its exterior side, and the opposite edges 22 of sheet 20 are each equipped with a rigid stiffener bar 24 (See FIG. 3). The stiffener bars 24 are glued or otherwise secured to the inside surface of the sheet 20 and extend vertically along the opposite side edge portions of the sheet. The location of the stiffener bars 24 on the inside surface of the sheet keeps them out of sight so that they do not detract from the attractive appearance of the windshield cover. At the same time, the stiffener bars add rigidity and strength to the sheet 20 and facilitate its attachment to the windshield, as will be explained more fully. Bars 24 may be made of wood or another material that is not subject to rusting.

Sheet 20 is fastened in place on the windshield by a pair of flexible straps 26. The straps 26 may be constructed of nylon. A rectangular ring 28 is secured on one end of each strap 26, as by ultrasonic sealing or stitching. Slots 30 are cut through sheet 20 at locations adjacent the inside edges of the stiffener bars 24. The slots are large enough to receive the straps 26. Each strap 26 is looped around the corresponding stiffener bar 24 and extended through the corresponding slot 30 and through the ring 26 before being pulled to draw the ring against the stiffener bar.

A pair of patches 32 are secured within the interior of the vehicle 10. Preferably, each patch 32 has an adhesive backing which is initially covered by a paper sheet. When the paper sheet is removed, the adhesive backing is exposed, and the patch 32 can then be pressed against the inside surface of post 14 in order to secure it in place within the vehicle. The exposed surface of patch 32 is provided with a series of hook fasteners 34 that are engaged by mating loop fasteners 36 secured to the inside surface of the strap 26. The mating hook and loop fasteners 34 and 36 on each pair of patches and straps are preferably of the type commercially available under the trademark VELCRO.

It is contemplated that the windshield cover will be furnished in kit form, with the sheet 20 initially being large enough to cover even the largest windshields. A paper pattern (not shown) may be provided in the kit to permit the outline of the windshield to be traced on the pattern so that the pattern can subsequently be used in the cutting of the sheet 20 to the appropriate size and shape to cover the windshield. Once this has been completed, the stiffener bars 24 can be glued or otherwise secured to the inside surface of the sheet at the proper locations, and the slots 30 can then be cut in the sheet. The straps 26 can then be extended through the slots 30, looped around bars 24, extended through rings 28 and then pulled tightly to draw rings 28 against the stiffener bars. The fastening patches 32 can also be adhesively secured at the proper locations on the posts 14.

The windshield cover can be applied by applying the sheet 20 to the exterior side of the windshield 12 with the sheet placed to completely cover the windshield. With the doors 18 open, the free ends of the straps can be extended through the door openings into the inside of the vehicle, and, with the straps pulled tightly, the loop fasteners 36 can be applied to the mating hook fasteners 34 on the patches 32, thereby holding the straps in a taut condition. This in turn secures sheet 20 firmly in place to completely cover the windshield 12.

When installed in this manner, the sheet 20 protects the windshield 12 against the effects of hail, ice, snow and other weather related problems. In addition, the cover blocks the windshield and prevents the sun from shining through it to unduly heat the vehicle interior during the summer.

It is necessary to have access to the inside of the vehicle in order to reach the free ends of the straps 26 so that they can be released from the fastening patches 32. Consequently, thieves are unable to steal the windshield cover without first breaking into the vehicle. At the same time, the fastening system holds sheet 20 in place securely enough to prevent it from blowing away to expose the windshield.

It is also important to recognize that the windshield cover can be removed entirely from within the vehicle. By first detaching one of the straps 26 from its mating patch 32 and then the other strap, sheet 20 can be reached through the window 16 and pulled into the interior of the vehicle without requiring the driver to stand outside of the vehicle. This is particularly important in inclement weather where it is desirable to remain out of the elements while the cover is being removed.

Preferably, the sheet 20 is neatly rolled up and stored in rolled form when not in use, since this prevents the sheet from being wrinkled or otherwise damaged. It is contemplated that the kit will be sold in a plastic bag which can subsequently be used for storage of the rolled up sheet. The weather proof construction of the vinyl material which forms the outside surface of sheet 20 gives the windshield cover the ability to be used over an extended period of time without being damaged by weather. Since all of the parts of the windshield cover are constructed from materials that will not rust, moisture is not a problem and does not detract from the ability of the windshield cover to function as intended.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A cover for a vehicle window, comprising:
   a flexible sheet having a size to cover the window on the exterior thereof, said sheet having opposite side edges for placement adjacent opposite ends of the window;
   a pair of rigid stiffener bars secured to the respective side edges of said sheet;
   a pair of slots in said sheet located adjacent the respective stiffener bars;
   a pair of flexible straps each having opposite ends and a ring on one end strap, said strap being looped around the respective stiffener bars and extended through the slots and pulled tightly through the rings to draw the rings against the stiffener bars, said straps each having a length to extend into the interior of the vehicle when said sheet is applied to the window;
   a pair of fasteners fixed within the interior of the vehicle; and
   fastening means on each strap applicable to the corresponding fastener within the interior of the vehicle to mate therewith in a manner to hold said straps taut to secure the cover on the window.

2. A cover as set forth in claim 1, wherein:
   said fasteners comprise patches secured within the vehicle; and
   said patches and said fastening means on the straps comprise mating hook and loop fasteners for holding the straps taut upon application of the straps to the patches.

* * * * *